(12) United States Patent
Malagnino et al.

(10) Patent No.: US 7,241,088 B2
(45) Date of Patent: Jul. 10, 2007

(54) THREADING TAP FOR CUTTING THREADS IN BLIND HOLES AND METHODS OF ITS MANUFACTURE

(75) Inventors: Giovanna Malagnino, Casellette (IT); Roberto Troilo, Turin (IT)

(73) Assignee: Sandvik Intellectual Property AB, Sandviken (SE)

( * ) Notice: Subject to any disclaimer, the term of this patent is extended or adjusted under 35 U.S.C. 154(b) by 104 days.

(21) Appl. No.: 10/765,847

(22) Filed: Jan. 29, 2004

(65) Prior Publication Data

US 2004/0247406 A1    Dec. 9, 2004

(51) Int. Cl.
    *B23G 5/06*    (2006.01)
(52) U.S. Cl. ............... 408/222; 408/144; 408/215; 408/220
(58) Field of Classification Search ............ 408/222, 408/144, 215, 219, 220; 76/108.1, 108.6, 76/115, 117; 470/198; 148/663; *B23G 5/00, B23G 5/06*
    See application file for complete search history.

(56) References Cited

U.S. PATENT DOCUMENTS

| | | | | |
|---|---|---|---|---|
| 1,395,198 A | * | 10/1921 | McFarlane et al. | 408/222 |
| 4,005,915 A | * | 2/1977 | Canfield | 384/129 |
| 4,507,028 A | * | 3/1985 | Matsushita | 408/230 |
| 4,547,228 A | * | 10/1985 | Girrell et al. | 148/209 |
| 4,563,223 A | * | 1/1986 | Dawes et al. | 148/217 |
| 4,687,525 A | * | 8/1987 | Biniasz et al. | 148/336 |
| 5,222,847 A | * | 6/1993 | Hiyama et al. | 408/222 |
| 5,487,626 A | * | 1/1996 | Von Holst et al. | 408/144 |
| 6,158,304 A | * | 12/2000 | Packer et al. | 76/104.1 |
| 6,217,267 B1 | * | 4/2001 | Sugano et al. | 408/222 |
| 6,220,797 B1 | * | 4/2001 | Ishii et al. | 408/144 |
| 6,235,128 B1 | * | 5/2001 | Chang et al. | 148/219 |
| 6,345,941 B1 | * | 2/2002 | Fang et al. | 409/74 |
| 6,506,270 B2 | * | 1/2003 | Takashina et al. | 148/578 |
| 7,144,208 B2 | * | 12/2006 | Henderer et al. | 408/144 |
| 2004/0179912 A1 | * | 9/2004 | Quanz | 408/222 |

FOREIGN PATENT DOCUMENTS

| | | | |
|---|---|---|---|
| FR | 2701226 A1 | * | 8/1994 |
| JP | 03019727 A | * | 1/1991 |

OTHER PUBLICATIONS

Tool And Manufacturing Engineers Handbook, 1983, Society of Manufacturing Eniginees, 4th ed., vol. 1, pp. 12-83, 12-84.*

* cited by examiner

*Primary Examiner*—Monica Carter
*Assistant Examiner*—Eric A. Gates
(74) *Attorney, Agent, or Firm*—Drinker Biddle & Reath LLP

(57) ABSTRACT

A threading tap for cutting threads in blind holes includes an elongated body with a central axis, the body having at a rear end a connector portion, and having at a front end a threading portion. The threading portion is provided with at least one helical thread-cutting structure and interconnected flank portions defining at least one helical flute which interrupts the helical thread cutting structure. The flank portions present exposed surfaces that are steam tempered. The rest of the tap is coated by PVD.

14 Claims, 5 Drawing Sheets

THREADING TAP FOR CUTTING THREADS IN BLIND HOLES AND METHODS OF ITS MANUFACTURE

BACKGROUND OF THE INVENTION

This application claims priority under 35 U.S.C. §§ 119 and/or 365 to Patent Application Serial No. 0300224-3 filed in Sweden on Jan. 30, 2003, the entire content of which is hereby incorporated by reference.

The present invention relates to a threading tap for cutting threads in blind holes, comprising an elongated body with a central axis and having at a first end a connector portion and at a second end a threading portion. The threading portion is provided with at least one helical thread extending about the circumference of said body. Flank portions of the thread define a helical flute which interrupts the helical thread.

The invention also relates to a method of manufacturing such a tap.

Such a tap and such a method are known from EP-A-0 641 620 (corresponding to U.S. Pat. No. 5,487,626), wherein the tap is provided with a wear resistant coating. However, the known taps suffer from the drawback that chips get entangled in the coated flutes when working in carbon steel, construction steel or stainless steel.

SUMMARY OF THE INVENTION

The object of the invention is to improve the properties of the tap regarding its threading properties.

This has been achieved by the threading tap as initially defined, wherein the exposed flank surfaces are steam tempered.

It has also been achieved by a method of the initially defined kind, including selecting a blank comprising an elongated body having a rear end and a front end and a central axis, forming at least one helical flute extending from the region of said front end towards said rear end, said flute being defined by interconnected flank portions, the improvement involving steam tempering exposed surfaces of the flank portions.

Hereby is achieved an improved chip evacuation from the blind hole towards the first end of the tap.

Preferably, the method includes forming a threading portion at said front end by forming at least one thread cutting structure about the circumference of said body extending from the region of said front end towards said rear end, said thread cutting structure being interrupted by said flute, and coating said thread by physical vapour deposition.

Alternatively, the forming of the flute and the steam tempering may be preceded by grinding the flute, forming the thread cutting structure, and coating said thread by physical vapour deposition, i.e., the flute is ground after the coating for removal of the coating from the flute before the steam tempering is performed.

Suitably, the helix angle, i.e. the angle of the flute relative to the axis is between 46° and 50°. In particular, the helix angle is between 48° and 50°. Hereby is achieved an even further improved chip evacuation, due to increased room for the chips, such that holes having a depth three times deeper than the diameter of the tap can be threaded. Helix angles smaller than 48° may cause less room for chip transportation, whereas helix angles larger than 50° may cause the vertical component of chip speed to be low. The optimal helix angle has proven to be 48°.

Advantageously, the thread is back-tapered (chamfered) towards the rear end. In particular the taper angle of the chamber is between 8° and 11°. Hereby is achieved an improved tap feeding during inversion moment, i.e. when the tap is removed from the hole, and furthermore a reduced absorbed torque.

Preferably, the rake angle of the thread is between 8° and 16°.

Suitably, the body is made of a high-speed steel. In particular, the high-speed steel has a hardness of 63.5–66.5 HRC. Hereby, an inexpensive tap is achieved. Alternatively, a powder steel material having a hardness of 64.5–67.5 HRC may be used.

Preferably, the thread cutting structure is coated by physical vapor deposition coating. In particular, the coating comprises one of TiCN, TiN, TiAlN, TiAlCN or CrN. Alternatively, a multi-layer coating such as a combination of TiAlN and WC/C (tungsten carbon and carbide, having a low hardness and low friction coefficient) may be used. Hereby, an extended life of the threads is achieved. It should be noted that the flutes are not coated by such a material, since this would cause wider and more irregular chips that get entangled in the flutes. Best performance on work-pieces made of carbon and construction steel is achieved by the use of TiAlN, whereas on stainless steel work-pieces, the best performance is achieved by the above mentioned multi-layer coating of TiAlN and WC/C.

Suitably, three flutes are distributed substantially evenly about the circumference of the body. Hereby is achieved an optimal chip removal for a diameter range of the tap of 3 to 16 mm. For diameter ranges of 16 to 20 mm, the best performance is achieved with four flutes distributed substantially evenly about the circumference of the body.

DRAWING SUMMARY

In the following the invention will be described in more detail with reference to the accompanying drawings, in which FIG. 1 is a perspective view of a threading tap according to the invention, comprising three flutes.

DETAILED DESCRIPTION OF PREFERRED EMBODIMENTS

Figure 1:
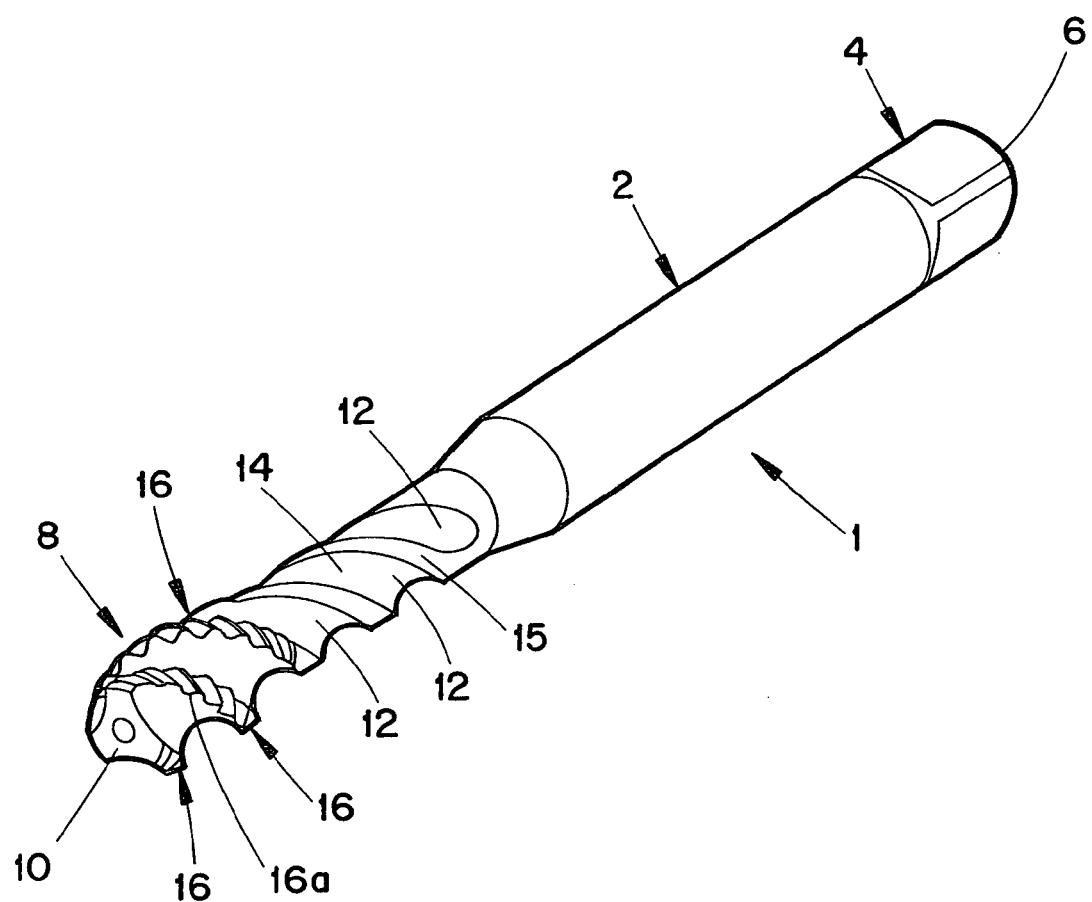

FIG. 1 shows a first embodiment of a tap 1 having an elongated body 2 with a connector portion 4 at a first or rear end region 6, and a toothed threading portion 8 at a second or front end region 10. The threading portion 8 comprises three helical threads 16 and three helical flutes 12, the flutes being defined by helical flanks 14 of the threads. The outer peripheries of the threads 16 have cutting teeth 16a formed thereon in the front end region 10. Portions of the threads extend rearwardly of the front region 10, and the outer peripheries of such portions are defined by flat (non-teethed) surfaces 15. The teeth 16a are aligned helically about the circumference of the body to define a helical thread-cutting structure that is interrupted by the flutes 12.

Figure 2:
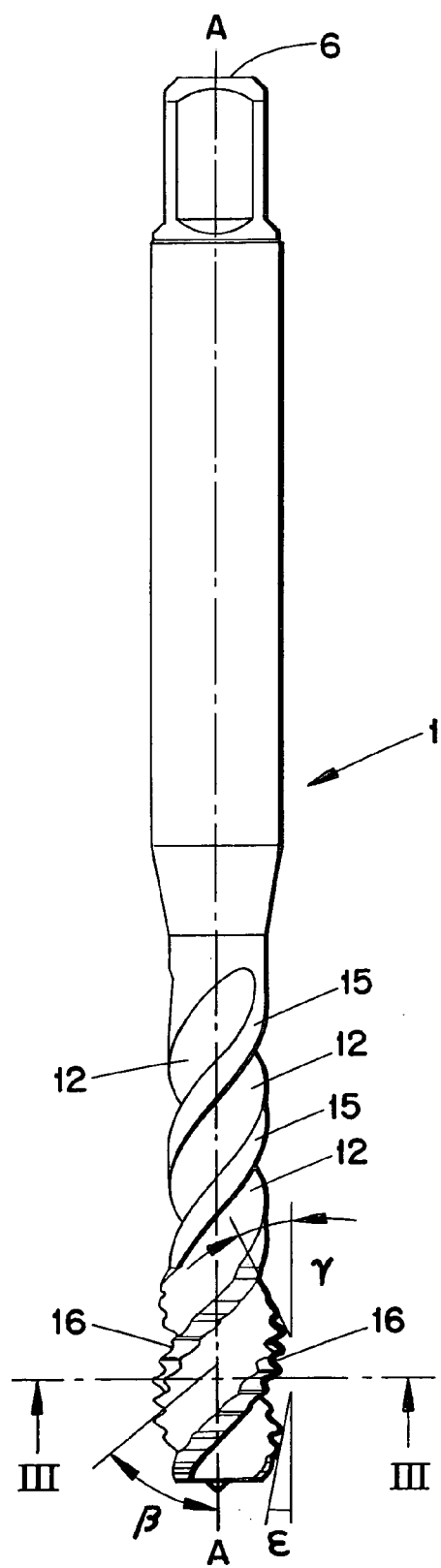
FIG. 2 is a side view of the threading tap shown in FIG. 1.

In FIG. 2, a central axis of rotation A—A is shown. A helix angle β is shown as an angle formed between the extension of a flute and the axis A—A and is from 46°–55°, more preferably 48°–50° and most preferably 48°. Furthermore it shown how the threading portion 8 has a first or front chamfer portion having a taper angle c, wherein the cross-section of the body increases in a rearward direction from a front tip of the body. A central section of the threading portion has a substantially constant outer diameter for a predetermined distance parallel to the central axis. The threading portion 8 ends with a second or rear chamfer portion having a back taper angle γ in the range of 8° to 11° directed towards the non-threaded portion 15 of flanks 14, wherein the cross section of the body becomes gradually smaller in a rearward direction.

Figure 3:
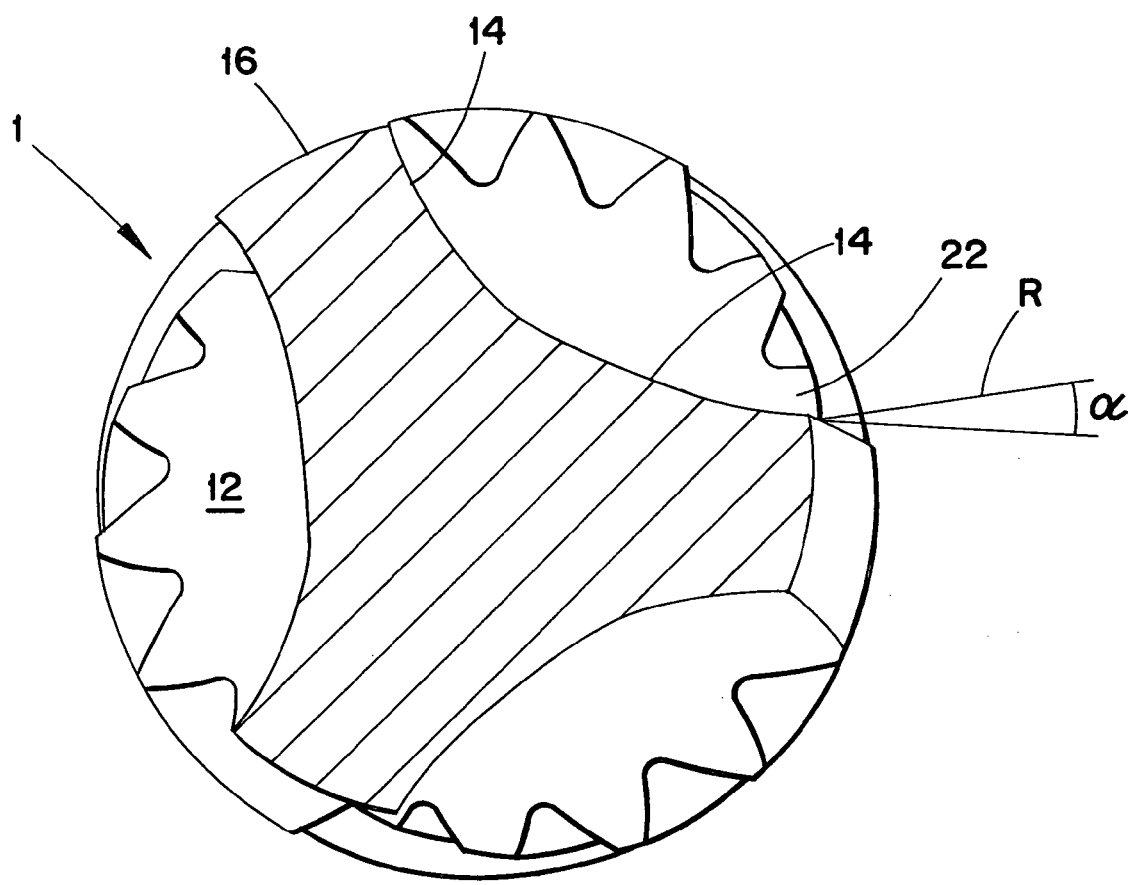
FIG. 3 is a cross-section along the line III—III in FIG. 2.

In FIG. 3 are shown the flutes 12, the flanks 14 and the thread 16 in cross section.

A region 22 where one of the flanks and the thread cutting teeth 16 meet forms a rake angle α with a radius R of the body in the range of 8°–16°.

Figure 4:
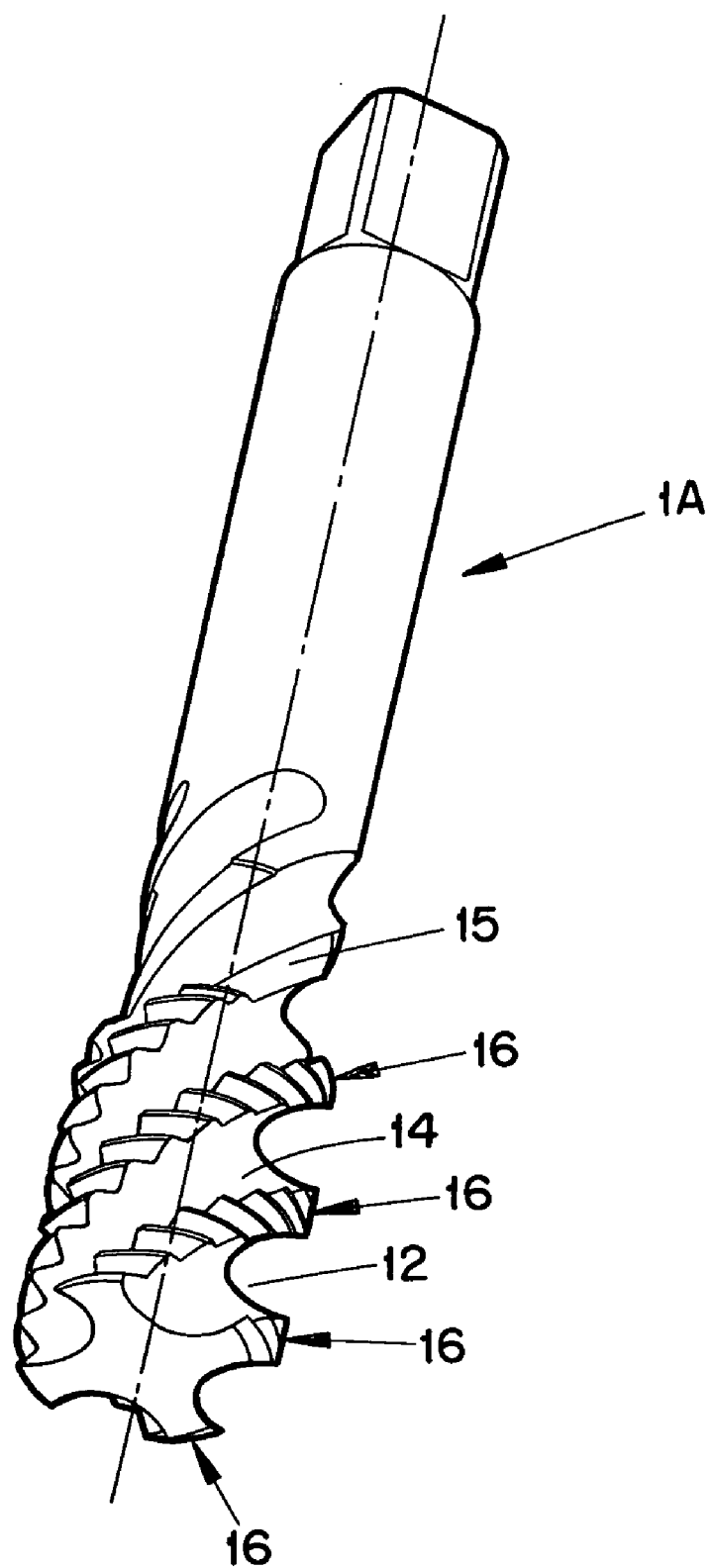
FIG. 4 is a perspective view of a threading tap comprising four flutes.
Figure 5:
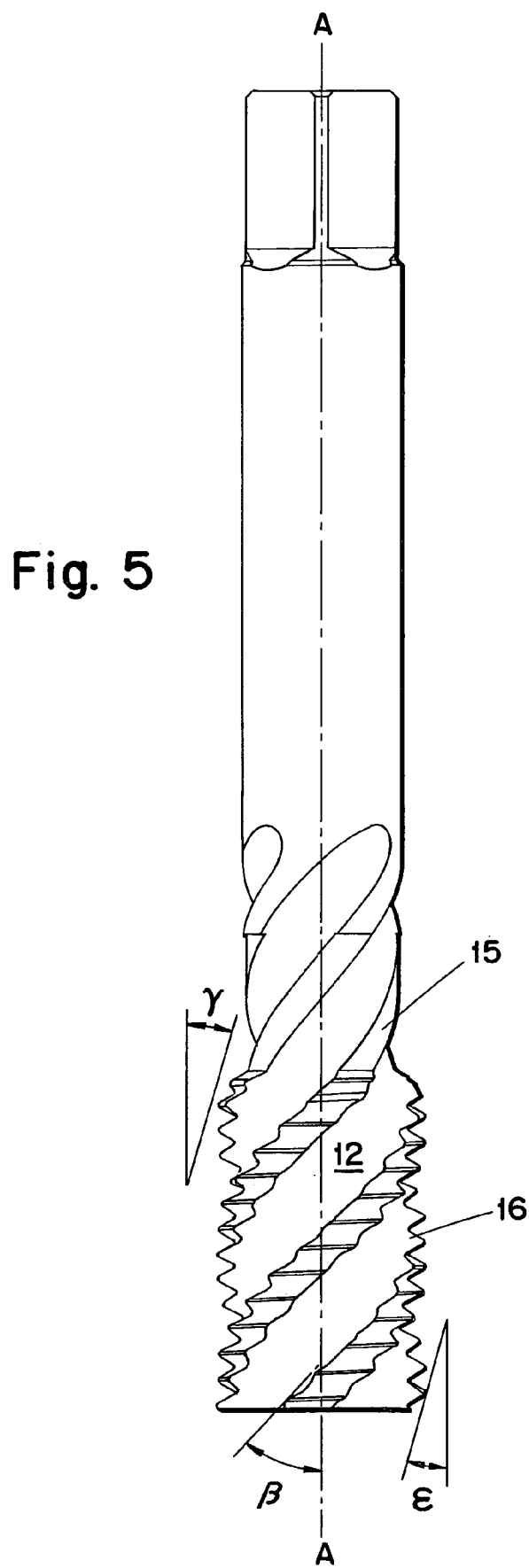
FIG. 5 is a side view of the threading tap shown in FIG. 4.

FIGS. 4–5 show a tap 1A according to a second embodiment which is similar to that of FIGS. 1–3, except that, instead of there being three threads and three flutes, there are provided four threads 16 and four flutes 12 defined by the flanks 14.

Regarding both embodiments described above, it is desirable to achieve extended life of the thread. This is conventionally performed by coating the thread by a physical vapor deposition coating (PVD), such as TiCN, TiN, TiAlN, TiAlCN or CrN, or a multi-layer coating such as a combination of TiAlN and WC/C (tungsten carbon/carbide, having a low hardness and low friction coefficient), called TiAlN/WC/C.

However, it has turned out that it is disadvantageous to have such a coating in the flutes, i.e. on the flanks, since the chips produced by such coated flutes are undesirably wide and irregular.

In accordance with the present invention, the exposed (uncoated) surfaces of the flanks are stream tempered. By using uncoated flutes, narrower and more regular chips are produced compared to the case when using fully coated taps. Also, by steam tempering the flutes, the wear resistance of the flutes is improved as compared to flutes that are both uncoated and non-steam tempered.

During manufacture of the tap from a blank, the flutes 12 are ground in the blank, and the entire ground blank is steam tempered with nitrogen ($N_2$) and carbon dioxide ($CO_2$) or with nitrogen ($N_2$) and water steam at 500° C. to 540° C. Steam tempering produces a black or blue oxidation layer on the top surface. Then, the thread teeth 16a are ground in the outer peripheries of the threads 16 and thereafter the chamfer portions and the back-tapered portion are ground. As a result of the grinding, the black or blue surface caused by steam tempering will remain only in the flutes, i.e. on the flanks thereof. Thereafter, the tap is provided with PVD coating, which will stick only to the ground surfaces, i.e. to the thread, the teeth and the chamfers, but not to the non-ground steam tempered flank surfaces. As a result, the exposed (visible) surfaces of the teeth are defined by a PVD coating, whereas the exposed (visible) surfaces of the flanks are defined by steam-tempered surfaces.

An alternative way of manufacturing the tap is to first grind the flutes, then grind the threads and then grind the chamfer portions and the back-tapered portions, and thereafter to perform the PVD coating. Thereafter, the flutes are reground and steam tempered, so that the coating is removed by the grinding, and the exposed surfaces of the flanks are thus defined by steam-tempered surfaces. It should be noted that steam tempering does not adversely affect the PVD coating on the non-ground sections regarding TiAlN, TiN, CrN, TiAlN/WC/C, and TiAlCN, because their oxidation temperature is higher than the steam tempering process temperature.

The flute shown in FIGS. 1–3 has an optimal chip removal for a diameter range of the tap of 3 to 16 mm, whereas for diameter ranges of 16 to 20 mm, the best performance is achieved with the tap shown in FIGS. 4–5.

In the preferred embodiments above, the taps have been shown as right hand taps. The rake angle α of course is also applicable to left hand taps.

Furthermore, the teeth 16a in each of the above-described embodiments define a single thread-cutting structure. Alternatively, the teeth could be arranged to define multiple teeth-cutting structures able to simultaneously cut multiple parallel teeth in a workpiece to form, for example, multi-start taps.

Of course, more than four flutes may be provided.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A threading tap for cutting threads in blind holes, comprising an elongated body defining an axis of rotation and including axial front and rear end regions, the front end region including a threading portion having teeth defining a helical thread-cutting structure, and at least one helical flute formed in an outer periphery of the body and interrupting the thread-cutting structure, the threaded portion being coated with a PVD coating and the at least one flute comprising interconnected flanks having exposed surfaces that are steam tempered but not coated with the said PVD coating.

2. A threading tap for cutting threads in blind holes of claim 1 wherein the thread-cutting structure is chamfered at a rear portion thereof and wherein the chamfered portion forms an angle in the range of 8°–11° relative to the axis.

3. The threading tap of claim 2 wherein the PVD coating is of TCN, TiN, TiAlN, TiAlCN, CrN or a multilayer coating.

4. The threading tap of claim 1 wherein the PVD coating is of TCN, TiN, TiAlN, TiAlCN, CrN or a multilayer coating.

5. The threading tap of claim 1 wherein a helix angle of the tap is 48°.

6. A method of manufacturing a threading tap suitable for cutting threads in blind holes, including the following steps:
   A) selecting a blank comprising an elongated body defining an axis of rotation and including axial front and rear regions;
   B) forming at least one helical flute in an outer periphery of the body, the at least one flute comprising interconnected flanks having exposed surfaces; and
   C) steam tempering only the exposed surfaces of the flute.

7. The method of claim 6 wherein said PVD coating is of TCN, TiN, TiAlN, TiAlCN, CrN or a multilayer coating.

8. The method of claim 6 wherein the entire threading tap is coated by PVD, the flutes are ground to remove the PVD coating and the tap is then steam tempered to steam temper the flutes.

9. The method of claim 6 wherein the entire threading tap is steam tempered, the threading portion is ground to remove the steam tempering and the tap is then subjected to PVD to coat only the ground portions.

10. A method of manufacturing a threading tap suitable for cutting threads in blind holes, including the following steps:
- A) selecting a blank comprising an elongated body defining an axis of rotation and including axial front and rear regions;
- B) forming at least one helical flute in an outer periphery of the body, the at least one flute comprising interconnected flanks having exposed surfaces;
- C) forming a threading portion including threads and teeth;
- D) coating the said threads and teeth with a PVD coating; and
- E) steam tempering the exposed surfaces of the flute.

11. The method of claim 10 wherein said PVD coating is of TCN, TiN, TiAlN, TiAlCN, CrN or a multilayer coating.

12. A method of manufacturing a threading tap suitable for cutting threads in blind holes, including the following steps:
- A) selecting a blank comprising an elongated body defining an axis of rotation and including axial front and rear regions;
- B) forming at least one helical flute in an outer periphery of the body, the at least one flute comprising interconnected flanks having exposed surfaces;
- C) forming a threading portion including threads and teeth;
- D) coating the said threads with a PVD coating; and
- E) steam tempering the exposed surfaces of the flute, wherein the steam tempering is performed at a temperature between 500° C. and 540° C.

13. A method of manufacturing a threading tap suitable for cutting threads in blind holes, including the following steps:
- A) selecting a blank comprising an elongated body defining an axis of rotation and including axial front and rear regions;
- B) forming at least one helical flute in an outer periphery of the body, the at least one flute comprising interconnected flanks having exposed surfaces;
- C) forming a threading portion including threads and teeth;
- D) coating the said threads with a PVD coating; and
- E) steam tempering the exposed surfaces of the flute, wherein the steam tempering is performed with nitrogen ($N_2$) and carbon dioxide ($CO_2$).

14. A method of manufacturing a threading tap suitable for cutting threads in blind holes, including the following steps:
- A) selecting a blank comprising an elongated body defining an axis of rotation and including axial front and rear regions;
- B) forming at least one helical flute in an outer periphery of the body, the at least one flute comprising interconnected flanks having exposed surfaces;
- C) forming a threading portion including threads and teeth;
- D) coating the said threads with a PVD coating; and
- E) steam tempering the exposed surfaces of the flute, wherein the steam tempering is performed with nitrogen ($N_2$) and water steam ($H_2O$).

* * * * *